(12) United States Patent
Shiokawa et al.

(10) Patent No.: US 7,560,150 B2
(45) Date of Patent: Jul. 14, 2009

(54) PACKAGING MATERIAL AND PACKAGING CONTAINER

(75) Inventors: Shunichi Shiokawa, Tokyo (JP); Shigeru Aida, Tokyo (JP)

(73) Assignees: Toppan Printing Co., Ltd, Tokyo (JP); Toyo Ink Mfg. Co., Ltd., Tokyo (JP)

( * ) Notice: Subject to any disclaimer, the term of this patent is extended or adjusted under 35 U.S.C. 154(b) by 702 days.

(21) Appl. No.: 10/526,023

(22) PCT Filed: Mar. 4, 2003

(86) PCT No.: PCT/JP03/02504

§ 371 (c)(1), (2), (4) Date: Aug. 4, 2005

(87) PCT Pub. No.: WO2004/020303

PCT Pub. Date: Mar. 11, 2004

(65) Prior Publication Data

US 2006/0021898 A1    Feb. 2, 2006

(30) Foreign Application Priority Data

Aug. 27, 2002  (JP) .............................. 2002-247728

(51) Int. Cl.
B29D 22/00 (2006.01)
B29D 23/00 (2006.01)
B32B 1/08 (2006.01)

(52) U.S. Cl. .................... 428/36.6; 428/35.9; 428/35.7; 430/7

(58) Field of Classification Search ................ 428/35.2, 428/36.5, 36.7, 35.7, 36.9, 36.91, 36.6, 35.9; 430/7

See application file for complete search history.

(56) References Cited

FOREIGN PATENT DOCUMENTS

JP    10-305511    11/1998
JP    2000-7047    1/2000

*Primary Examiner*—Michael C Miggins
(74) *Attorney, Agent, or Firm*—Staas & Halsey LLP

(57) ABSTRACT

A packaging container having a chromatic color ink layer which is formed in a light-blocking printed layer (3), wherein a chromatic color ink applied to the chromatic color ink layer contains a white color family pigment and a black color family pigment and the contents of said black color family pigment amount to 3 to 5 parts by weight per 100 parts by weight of the total amount of the pigments in the chromatic color ink. The packaging container retains appropriate opacifying properties and light-blocking properties and provides no metallic residue when incinerated.

9 Claims, 1 Drawing Sheet

PACKAGING MATERIAL AND PACKAGING CONTAINER

This application is related to PCT International Application No. PCT/JP2003/002504 filed Mar. 4, 2003, it being further noted that priority is based upon Japanese Patent Application No. 2002-247728, filed Aug. 27, 2002.

TECHNICAL FIELD

The present invention relates to a packaging material which has excellent opacifying properties and light-blocking properties and relates to a packaging container made from the packaging material.

BACKGROUND ART

In recent years, a marketing product using a packaging container which keeps foods having oil and fat content such as confectionary, retort food, frozen food, processed meat, condiments, and powdered soup as contents, is required to avoid alterations of food tastes and of qualities during a period from producing the marketing product until supplying to customers by retaining the light-blocking properties. Besides the above mentioned, in a packaging container which keeps medical drugs with taking the embodiments such as medicinal solution, medicinal agent, and health drink and moreover, in a packaging container which keeps industrial products such as liquid detergent, shampoo, rinse, and softener, contents are required to avoid alterations by retaining the light-blocking properties.

Also, when displaying the above mentioned various marketing products, representing contents by various kinds of designs on surface of a packaging container so as not to be seen the contents is advantageous to encourage the willingness to buy by customers and at the same time the opacifying properties to a packaging material are also required to retain.

Accordingly, for such packaging container a packaging material having light-blocking properties by laminating a metal foil such as aluminum so that using metal foil is also effective to improve the opacifying properties.

Meanwhile, the above mentioned packaging container is widely and commonly distributed and consumed and mostly faces to be disposed after use as wastes, and in case of a thermal disposal of the packaging container, the fact that metal portion in the packaging material remains as residues in an incinerator, is acknowledged as a problem.

From this point of view, in order to retain light-blocking properties without a use of metal such as aluminum, providing a light-blocking printed layer which is made as an achromatic color in a layer structure of the packaging material has become so as to be tried.

Providing a light-blocking printed layer, accordingly, can be easily conducted by printing during production of the packaging material so that there is a big advantage of no increase in production costs. But in case that a light-blocking printed layer is formed by an all-over printing with the black color which gives a great effect for acquirement of light-blocking and opacifying properties, the color as the packaging container of market product for general customers in the external appearance is hard to be accepted, especially as the color of the packaging container for foods and simultaneously, in case that the all-over printing by the black color is observed in the inside of the packaging container of food, a neatness can not be expected to the state of contents which is surrounded by the black color surface. Also, in case that a light-blocking printed layer is formed by an all-over printing only in the white color, the light-blocking properties of the packaging material provide insufficiency as drawbacks.

SUMMARY OF THE INVENTION

The object of the present invention is to retain appropriate opacifying properties and light-blocking properties of a packaging material with a light-blocking printed layer while utilizing the advantage that a production is easy, and the purpose is to obtain the packaging container which utilizes the usefulness of packaging container having a light-blocking printed layer while no metal residues is resulted in case that incinerations are conducted, which can keep various contents, which does not destroy design of an external appearance, and which can prevent the deterioration of contents by light.

The present invention is provided under considerations of the above mentioned object and relates to solve the above mentioned subject by proposing a packaging material where a chromatic color ink layer, which comprises a chromatic color ink containing a white color family pigment and a black color family pigment and a chromatic color ink comprising the above mentioned black ink in the amount of 3 to 5 parts by weight per 100 parts by weight of the total amount of the chromatic color ink, is provided to a light-blocking printed layer.

And according to the present invention, in the above mentioned light-blocking printed layer, at least one white ink layer is preferable to be provided.

Also the above mentioned chromatic color ink layer is preferable to have a lightness of 5 to 7 and a chroma of 0 to 4 in the Mansell color system, and a light permeability is preferable to be 10% or less at the wave length range of 300 to 800 nm.

Also, according to the present invention a base film, the above mentioned light-blocking printed layer, and a sealant layer are preferable to have the laminated structure in subsequent manner and the above mentioned sealant film is preferable to be laminated by way of plural layers. And a base film is possible to be made as a transparent gas barrier film.

Also according to the present invention, when a bag is made, a packaging material layer structure can be formed to have the odor ingredients barrier layer at the side to be internal from said light-blocking printed layer.

Also according to the present invention, the impact resistive layer which absorbs impact is possible to have in the packaging material layer structure.

And further, for another feature of the present invention, a packaging container is provided by use of the above mentioned packaging material and the above mentioned subject is solved by providing the packaging container.

According to the present invention, the packaging material can be provided wherein the opacifying properties can be obtained by retaining the suitability of a color hue with the pattern printing, and simultaneously suitable light-blocking properties which can prevent the deterioration of contents kept in the inside of the packaging container by preventing a permeability of light, can be obtained under low production cost having appropriate opacifying properties and light-blocking properties by printing method, and the packaging container which is also the excellent design and deterioration prevention of contents can be provided. Moreover, by providing odor ingredients barrier layer, an excellent effect is provided practically such that odor ingredients of a printing ink used for a light-blocking printed layer can be definitely prevented from giving the influence to contents.

DETAILED DESCRIPTION OF THE PREFERRED EMBODIMENT

The preferred embodiments of the present invention will be explained in detail as follows with reference to the drawings in FIGS. 1 and 2.

Figure 1:
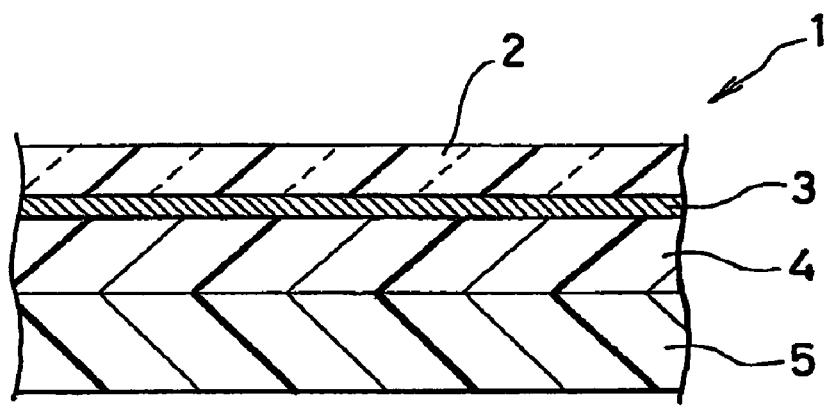
FIG. 1 illustrates a layer structure in a packaging material according to the present invention.

FIG. 1 illustrates a layer structure in the packaging material 1. The packaging material 1 is made as the layer structure having the sealability at the portions of the internal side of the container so as to be able to laminate the end portions by heat sealing the end portions of which packaging materials are laid on each other just as a retort pouch type packaging container. And the packaging material structure comprises to laminate the base film layer 2, the light-blocking printed layer 3, the intermediate material layer 4 and the sealant layer 5 from the external side of the packaging, and as will hereinafter be described by the existence of the above mentioned light-blocking printed layer 3, the opacifying properties and the light-blocking properties are made to be provided.

(Base Material Film Layer)

In the packaging material 1, the above mentioned base material film layer 2 is a transparent and for the base material film which constitutes the base material film layer 2, the transparent film and mono- or bi-axially oriented thermoplastic resin films such as polyethylene terephthalate (PET), polypropylene film (PP), nylon (Ny) and the like are suitable to be applied.

Moreover, if the material which has gas barrier properties is applied as the base material film, the gas permeability as a whole becomes low level so that the packaging container made from the packaging material can be so as to prevent the deterioration of contents by oxidation, for example, by prevention from the permeation of the external oxygen. For the base film to constitute the base material film layer 2 having gas barrier properties, the transparent vapor deposition film which is vapor deposited of inorganic compound such as silicate dioxide or aluminum oxide (alumina) to mono- or bi-axially film of the above mentioned thermoplastic resin (Toppan Printing Co., Ltd. Trade name GL Film) and the like, or the transparent film such as polyester film, nylon film, and polypropylene film and the like, which is coated by coating agent of gas barrier resin as the main material, or a film having itself a high gas barrier (EVOH (saponified ethylene-vinyl acetate copolymer) film, PVDC (polyvinylidene chloride) film and the like) can be applied.

(Sealant Layer)

The above mentioned sealant layer 5 can be made of the structure by use of sealant film. As the sealant film the heat resistant film comprising polyolefin resin film such as polyethylene, polypropylene, ethylene-acetic acid copolymer, ethylene-propylene block copolymer and easy-peel film can be applied and the sealant layer 5 can be constituted as multilayer which single or plural sealant films are laminated in subsequent manner. And in case that the packaging material is formed for the container which is required heat resistive properties such as boiling or retort application packaging and the like, the non-oriented polypropylene film is preferable to be applied as the sealant layer.

(Intermediate Base Material Layer)

As the above mentioned intermediate base material layer 4, the nylon film can be used, and also various base materials applied for the intermediate base material in the general packaging material of laminated layer structure can be applied. And in order to improve drop impact strength of the packaging container made by sealing the filling space of the packaging material 1 by conducting heat sealing on the end portions, the oriented nylon film which has excellent impact strength by absorbing the impact for the intermediate base material layer 4, and the intermediate base material layer 4 can be made as impact absorbing layer so that impact strength and pinhole resistivity of the packaging material are improved. However, the intermediate base material film layer 4 is not necessarily required depending upon the embodiment of the packaging container.

Moreover, by applying the above mentioned oriented nylon film as the base material film layer 2, the base material film layer 2 can be made as the impact absorbing layer having impact strength resistance, which can contribute the improvement of impact resistance properties and pin hole resistance properties of the packaging material.

The lamination between each of the above mentioned film can be applied by the extrusion coating and non-solvent lamination and the like, besides the dry lamination method.

(Light-Blocking Printed Layer)

Meanwhile, the light-blocking printed layer 3 has the structure of the laminated layer printing, with the white color ink layer of single- or plural-layer which is all-cover printed to the surface of the internal side of the container of the base material film which constitutes the above mentioned base material film layer 2 and the chromatic color ink layer which is over printed by all-cover printing to the white color ink layer.

As will hereinafter be described, the chromatic color ink layer is constituted by all-over printing with the chromatic color ink which contains a white color family pigment and a black color family pigment where the amount of the black color family pigment is of 3 to 5 parts by weight in the 100 parts by weight of the total pigment of the chromatic color ink.

A color of the above mentioned chromatic color ink layer is decided by the selection of the chromatic color ink which constitutes the chromatic color ink layer, and is adjusted in the hue of the Mansell color system so as to be included in the range of R, YR, Y, GY, G, BG, B, PB, P, RP. Moreover, the color of the chromatic color ink layer is adjusted so as to be included in each range for the lightness of 5 to 7, and the chroma of 0 to 4 in the Mansell color system.

Accordingly, a lightness of the packaging material 1 is produced when the light-blocking printed layer 3 is observed from the transparent base material film layer 2 side, in case that the light-blocking printed layer 3 is provided, previously providing design pattern printing or letter printing to the internal side of the above base material film layer 2, the light-blocking printed layer 3 becomes the background of the above mentioned design pattern or letter printing and provides the lightness so that the design properties of the design pattern or letter printing are made so as to improve.

Moreover, when the light-blocking printed layer 3 is observed as the internal surface of the filling space after the packaging container made by packaging material 1 is opened, the warmness is produced and by having comfortable feeling, the color becomes harmonious with contents.

Also, in the light-blocking printed layer 3, in addition to the selection of the color in the above mentioned range of the chromatic color ink layer, the light beam permeability in the wavelength range of 300 to 800 nm is adjusted to be 10% or less. A setting of the light beam permeability in the above mentioned wavelength range can be provided by the selection of the color of the chromatic color ink layer, and accordingly, the wave light which causes the deterioration of contents which are kept in the packaging container, is absorbed so that the deterioration of contents is prevented effectively.

And by the existence of the above mentioned chromatic color ink layer in the light-blocking printed layer 3, the permeability of light beam from the sealant layer 5 side of the packaging material 1 is also prevented so that the opacifying properties of the product supplied to the sealant layer 5 side of the packaging material 1 are in high level. Accordingly, the packaging container made by the packaging material 1 provides high opacifying properties of contents which are kept in the filling space and contents are hidden from the outside and the product can be emphasized by the design pattern on the surface side of the packaging container.

(Packaging Container)

The packaging container embodiment obtained by the above mentioned packaging material 1 according to the present invention is not limited and the present invention can be conducted in the packaging container of standing pouch type embodiment, the packaging container of gusset packaging embodiment, the packaging container of pillow packaging embodiment, and the packaging container of three-edge sealed pouch packaging embodiment. Moreover, the packaging material can be applied as the cover-material which covers the opening of the container.

(Comparative Study)

Accordingly, by preparing the packaging materials for Examples 1 to 6 and Comparative Example 1 and 2 on the variation of the respective structures of the light-blocking printed layer, and after the comparative studies are performed, the results are shown in Table 1 and Table 2. Each Example 1 to 6 and Comparative Example 1 and 2 other than the light-blocking printed layer are as follows.

To begin with, for the base material film layer, the gas barrier film, which is made by polyester film (thickness 12 μm) coated with the inorganic vapor film comprising aluminum with a thickness of approximately 200 Å, is used.

The oriented nylon film (thickness 15 μm) is applied for the intermediate base material layer.

For the sealant layer, non-oriented polypropylene film (thickness 70 μm) is used and then dry lamination is conducted with 3 g/m$^2$ coating of the urethane adhesive for retort application.

In order to study a light-blocking, the white ink layer by the white color family pigment in the light-blocking printed layer is printed over-printings for two times by all-over printing with plate depth 35 μm, and then on top of that, the chromatic color ink selected by the blending at a certain level of red color family, brown color family, yellow color family, deep blue color family, green color family and black color family pigments having light-blocking properties is printed by all-over printing under the plate depth of 35 μm.

As a result of the study, in case of retaining light-blocking properties, as for each chromatic color ink, the blending ratio of the black color pigment is concluded that 3 to 5 parts by weight in the 100 parts by weight of the total pigment are preferable.

The packaging containers are prepared by the packaging materials of each Example 1 to 6 and meat sauce is used for the contents. And to the packaging container, after retort sterilizing at 121° C. for 30 minutes, the condition of an integral illumination for 8 weeks as luminescent lamp 1,500 lux is conducted.

As a result, the packaging containers prepared by the packaging materials of each Example 1 to 6 show satisfactory that the oxygen permeability after retort sterilization of the packaging materials in all Examples is 15.0 ml/m$^2$·day·MPa, (30° C., 70% RH by MOCON method). Also, in the organoleptic test all the packaging containers prepared by the packaging materials of each Example 1 to 6 show satisfactory.

Then, while in case that the opacifying properties are retained, the suitability from the design point on the color hue of the pattern provided on the base material film layer and the color hue of the light-blocking printed layer (chromatic color ink layer) is studied, and the suitable number of laminated layers of the white color ink layer is studied. The result is shown in Table 3.

As a result of study, the preferable color hue of the light-blocking printed layer is concluded to be the similar family color with the pattern color hue. Also, in each chromatic color ink, the blending ratio of the black color pigment is concluded to be satisfactory until 3 parts by weight in the 100 parts by weight of the total pigment of chromatic color ink.

The white color ink layer, the chromic color ink layer, and further the pattern printed layer of the above mentioned light-blocking layer 3 can be formed by the ordinary gravure printing method and other printing methods by use of ordinary oily- or water-based printing inks. And since printing inks used for packaging materials have peculiar odors caused by pigment, binder, and other ingredients (hereinafter odor ingredients) and since organic solvent is used in addition to the case of oily-based printing inks, odor ingredients in the light-blocking layer 3 can be migrated to contents filled in the bag, and in case of migration, sometimes contents become ill flavors. The influences of the odor ingredients generate more remarkably when heat treatments such as boiling and retort (normally sterilization purpose) are conducted.

Also, according to the conventional packaging material by the use of metal foil, odor ingredients of printed layer positioned at the external side generate no problem such as migration to contents because the metal foil blocks odor ingredients and deterioration of flavors by odor ingredients causes less problem if the thickness (an amount of ink) is used for ordinary printing of pattern but in case that the light-blocking layer 3 for the purpose of light blocking, the thickness to the printed layer (an amount of ink) has a tendency to thicken (large amount) compared with ordinary printing, so that deteriorations of flavors can sometimes become problems.

Accordingly, when there is a possibility of migration of the odor ingredients to contents, the possibility is necessary to be eliminated. Therefore, with respect to the packaging material provided the light-blocking properties by applying the light-blocking layer in the layer structure, satisfactory example is shown to eliminate even the possibility of the odor ingredients migration as follows.

Figure 2:
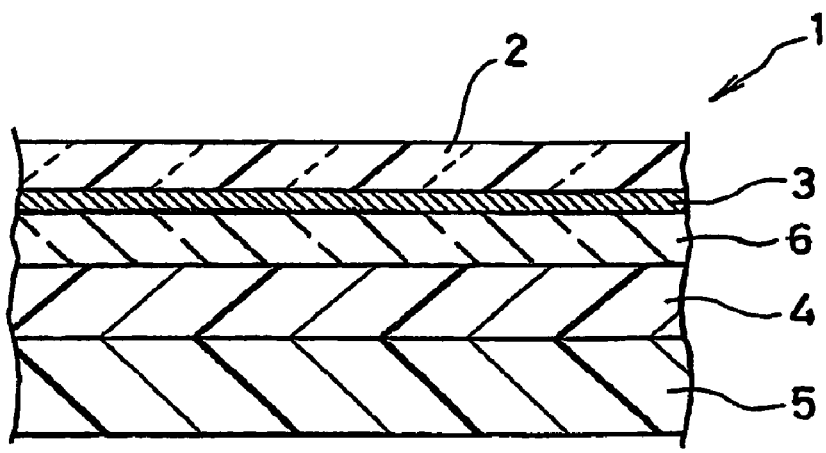
FIG. 2 illustrates a layer structure in an example of a packaging material having an odor ingredient barrier layer according to the present invention.

To be more precise, as shown in FIG. 2, the packaging material 1, when a bag is made, providing the layer structure of lamination from the internal side of the bag to the external side of the bag, is preferable to be laminated as the sealant layer 5, the intermediate base material layer 4, the odor ingredients barrier layer 6, the light-blocking printed layer 3, and the base material film layer 2.

The above mentioned odor ingredients barrier layer 6 which is in the internal side of the bag from the light-blocking printed layer 3 when packaging bag, and which is located between the light-blocking layer 3 and the sealant layer 5, is desirable to provide blocking or impermeability against odor ingredients to the internal side of the bag caused by the printing inks in the light-blocking layer 3, and the transparent gas barrier film (the film that is vapor deposited of inorganic compound such as silicate dioxide or aluminum oxide (alumina) to mono- or bi-axial thermoplastic resin film (Toppan Printing Co., Ltd. Trade name GL Film) and the like) which is given as the example in the base material film layer 2 is preferable to be applied, and besides, films such as polyethylene terephthalate, polyvinylidene chloride, saponified ethylene-vinyl acetate copolymer, MXD-Ny and the like and films coated by barrier coating resins can also be applied.

Naturally, to the above mentioned example, the intermediate base material layer 4 which is provided between the sealant layer 5 and odor ingredients barrier layer 6 can be provided by the oriented nylon film as the impact absorption layer which provides the excellent impact strength so as to absorb the impact. Moreover, the oriented nylon film for the base material film 2 is also acceptable to provide as an additional role for impact absorption layer. However, even in the above mentioned example, the intermediate base material layer 4 is not required essentially.

And in the example of having the odor ingredients barrier layer as the sealant layer, non-oriented polypropylene film can be used, and other thermoplastic resin films if applicable to the condition, can be applied, and films made from polyolefin resin such as polyethylene, polypropylene, ethylene-vinyl acetate copolymer, ethylene-propylene block copolymer and the like can be used.

Besides dry lamination, extrusion coating and non-solvent lamination and the like can be applied for lamination between each of the above mentioned film.

The detail examples of layer structures of the packaging materials providing the above mentioned odor ingredients barrier layer 6 and equally providing the light-blocking printed layer 3 are shown as follows.

PET (base material film layer)/light-blocking printed layer/adhesive/aluminum oxide vapor deposition PET (odor ingredients barrier layer and aluminum oxide vapor deposition to PET)/adhesive/CPP (sealant layer)

PET (base material film layer)/light-blocking printed layer/adhesive/aluminum oxide vapor deposition Ny (odor ingredients barrier layer and aluminum oxide vapor deposition to Ny)/adhesive/CPP (sealant layer)

aluminum oxide vapor deposition PET (base material film layer)/light-blocking printed layer/adhesive/aluminum oxide vapor deposition PET (odor ingredients barrier layer)/adhesive/CPP (sealant layer)

PET (base material film layer)/light-blocking printed layer/adhesive/aluminum oxide vapor deposition PET (odor ingredients barrier layer)/adhesive/ONy (impact absorption layer)/adhesive /CPP (sealant layer)

PET (base material film layer)/light-blocking printed layer/adhesive/aluminum oxide vapor deposition PET (odor ingredients barrier layer)/adhesive/(Ny/CPP) coextrusion film (impact absorption layer and sealant layer)

Here, PET is described as the polyethylene terephthalate film, ONy as the oriented nylon film, and CPP as the non-oriented polypropylene film. Also, (Ny/CPP) coextrusion film comprises lamination film of non-oriented nylon film and non-oriented polypropylene film.

As the packaging materials of the present invention which is provided with an additional odor ingredients barrier layer, the following Example 7 and Comparative Example 3 are prepared as the following structure, and migrations of odor ingredients are observed by the method described below.

<The Layer Structure of the Packaging Material having the Odor Ingredients Barrier Layer in Example 7>

PET (base material film layer)/light-blocking printed layer/adhesive/aluminum oxide vapor deposition PET (odor ingredients barrier layer)/adhesive/ONy (intermediate material layer)/adhesive/CPP (sealant layer)

The light-blocking printed layer is formed on PET film having thickness 12 μm in the same manner as the above mentioned Example 1. The light-blocking printed layer 3 is laminated with transparent film which is provided by 12 μm thick PET film having 50 nm aluminum oxide vapor deposition layer (Toppan Printing Co., Ltd. GL Film (Trade Name)) as the odor ingredients barrier layer 6 by means of the dry lamination method (The vapor deposition side is positioned so as to face to the base material film layer 2). Subsequently, the packaging material of the present invention is obtained where 15 μm thick biaxial oriented 6,6 nylon film (as the intermediate base material layer 4) and 60 μm thick non-oriented polypropylene film (as the sealant layer 5) are laminated in subsequent manner on the aluminum oxide vapor deposition layer by means of dry lamination method.

<The Layer Structure of Comparative Example 3> aluminum oxide vapor deposition PET (base material film layer)/light-blocking printed layer/adhesive/ONy (intermediate base material layer)/adhesive/CPP (sealant layer)

The light-blocking printed layer 3 is formed as same in Example 1 to a vapor deposition layer of the transparent barrier film which is provided by 12 μm thick PET film having 50 nm aluminum oxide vapor deposition layer (Toppan Printing Co., Ltd. GL Film (Trade Name)). [原文 17 頁] Comparative Example 3 packaging material is prepared where biaxially oriented 6,6 nylon film (as the intermediate base material layer 4) as same in Example 7 and non-oriented polypropylene film (as the sealant layer 5) are laminated in subsequent manner by means of dry lamination method on the light-blocking printed layer 3.

The light-blocking properties of Example 7 and Comparative Example 3 show sufficient light shielding properties for food storage packaging material where the total light beam permeability is 10% or less (Measurement apparatus: SHIMADZU Spectrophotometry).

By applying the packaging materials, a four-edge sealed bag of the size 130 mm by 180 mm is made and after 200 ml of distilled water are filled as the content and sealed, a retort treatment was conducted at 121° C. for 30 minutes. Subsequently, the content (distilled water) was analyzed by GC-MS analytical apparatus made by Agilent Technologies.

The both of total light permeabilities show 10% or less after retort sterilization.

The oxygen permeability after retort sterilization of the packaging material in Example 7 is 14.0 ml/m$^2$·day·MPa, and Comparative Example 6 is 16.0 ml/m$^2$·day·MPa. The oxygen permeability is measured under the condition of 30° C., 70% RH by MOCON method.

As a result according to the above mentioned analytical apparatus, the peak which is estimated by the ingredients caused by printing ink, is observed only in Comparative Example 3. Also according to the organoleptic test for both contents, no foreign taste or foreign odor was detected in Example 7 while a subtle foreign taste or foreign odor was found in Comparative Example 3.

Therefore, Example 7 is concluded that the packaging material is suitable to obtain the packaging container to keep retort food.

INDUSTRIAL APPLICABILITY

By providing the chromatic color ink layer which is composed of a chromatic color ink which contains a white color family pigment and a black color family pigment where the above mentioned black ink amounts of 3 to 5 parts by weight per 100 parts by weight in the total amount of the chromatic color ink, in the light-blocking printed layer 3, a packaging container, which is utilizing the advantage that production is easy, which retains appropriate opacifying properties and light-blocking properties of a packaging material with a light-blocking printed layer, which utilizes the usefulness of packaging container having the light-blocking printed layer which no metal residues result in case of incinerations being conducted, which can keep various contents, and which does not destroying a design of observation and preventing the deterioration of content by light, can be obtained.

TABLE 3

| Color Hue of Pattern | Suitable Color Hue to Pattern of Light-Blocking Printed Layer (Notation of Mansell Color System Color Hue) | White Color Ink Layer Structure when Adequate Light Blocking Printed Layer |
| --- | --- | --- |
| White Color Family | All Color Hue OK | White Color Ink Layer is preferable to over printing for at least twice by all-cover printing. |
| Yellow Color Family | Y~GY | White Color Ink Layer is preferable to select one time all-cover printing or over printing depending on design |
| Red Color Family | RP~R~YR | Same as above |
| Purple Color Family | All Color Hue OK | Same as above |

TABLE 1

| | Layer Structure Light-Blocking Printed Layer | Total Light Beam Permeability (%) | Mansell Color System Color Hue | Mansell Color System Lightness | Mansell Color System Chroma | Blending Ratio of Chromic Ink (Mass Ratio) |
| --- | --- | --- | --- | --- | --- | --- |
| Example 1 | W Ink Layer/W Ink Layer/ R · Bl · W Chromatic Color Ink Layer | 7.2 | 0.7R | 5.7 | 1.6 | W/R/Bl = 88/7/5 |
| Example 2 | W Ink Layer/W Ink Layer/ Y · R · Bl · W Chromatic Color Ink Layer | 8.2 | 9YR | 6 | 1 | W/Y/R/Bl = 89/3/3/5 |
| Example 3 | W Ink Layer/W Ink Layer/ Y · Bl · W Chromatic Color Ink Layer | 6.9 | 2GY | 6 | 1.5 | W/Y/Bl = 88/7/5 |
| Example 4 | W Ink Layer/W Ink Layer/ Y · G · Bl · W Chromatic Color Ink Layer | 5.2 | 1.7G | 5.6 | 2 | W/Y/G/Bl = 86/7/3/4 |
| Example 5 | W Ink Layer/W Ink Layer/ R · DB · Bl · W Chromatic Color Ink Layer | 6.2 | 3.5PB | 5.4 | 2 | W/R/DB/Bl = 91/3/3/3/ |
| Example 6 | W Ink Layer/W Ink Layer/ R · Br · Bl · W Chromatic Color Ink Layer | 5.6 | 8.4RP | 5.7 | 2.2 | W/R/Br/Bl/ = 92/2/3/3 |

Y: Yellow color family pigment,
R: Red color family pigment,
Bl: Black color family pigment,
W: White color family pigment,
DB: Deep Blue color family pigment,
Br: Brown color family pigment
Total light beam permeability is measured by UV-3100 manufactured by SHIMADZU CORPORATION.
Color hue, lightness, and chroma of Mansell color system are measured by color difference calorimeter R200 manufactured by MINOLTA Co., Ltd.

TABLE 2

| | Layer Structure Light-Blocking Printed Layer | Total Light Beam Permeability (%) | Mansell Color System Color Hue | Mansell Color System Lightness | Mansell Color System Chroma | Blending Ratio of Chromic Ink (Mass Ratio) | Evaluation |
| --- | --- | --- | --- | --- | --- | --- | --- |
| Comparative Example 1 | W Ink Layer/W Ink Layer/ R · Bl · W Chromatic Color Ink Layer | 15 | 5.1RP | 6.4 | 2.7 | W/R/Bl = 95/3/2 | Inferior in Light-Blocking Performance |
| Comparative Example 2 | W Ink Layer/W Ink Layer/ R · Br · Bl · W Chromatic Color Ink Layer | 5 | 4.5YR | 3 | 2.1 | W/Y/Br/B = 88/3/3/6 | Inferior in Design Performance |

Y: Yellow color family pigment,
Bl: Black color family pigment,
W: White color family pigment,
Br: Brown color family pigment
Total light Beam permeability is measured by UV-3100 manufactured by SHIMADZU CORPORATION.
Color hue, lightness, and chroma of Mansell color system are measured by color difference calorimeter R200 manufactured by MINOLTA Co., Ltd.

TABLE 3-continued

| Color Hue of Pattern | Suitable Color Hue to Pattern of Light-Blocking Printed Layer (Notation of Mansell Color System Color Hue) | White Color Ink Layer Structure when Adequate Light Blocking Printed Layer |
|---|---|---|
| Blue Color Family | All Color Hue OK | Same as above |
| Green Color Family | Y~GY~G | Same as above |

What is claimed is:

1. A packaging material comprising a light-blocking printed layer having a chromatic color ink layer which is made of a chromatic color ink containing a white color pigment and a black color pigment and is adjusted in the hue of the Mansell color system so as to be included in the range of R, YR, Y, GY, G, BG, B, PB, P, RP and in which the content of said black color pigment amounts of 3 to 5 parts by weight per 100 parts by weight of the total amount of the pigments in the chromatic color ink.

2. The packaging material according to claim 1, wherein at least one layer of a white ink layer is provided in said light-blocking printed layer.

3. The packaging material according to claim 1, wherein in the Mansell color system, a lightness of said chromatic color ink layer is of 5 to 7, a chroma is of 0 to 4 and the light beam permeability is 10% or less at wavelength of 300 to 800 nm.

4. The packaging material according to claim 1, wherein the layer structure has an odor ingredients barrier layer at the side to be internal from said light-blocking layer in a bag when the bag is made.

5. The packaging material according to claim 1 wherein an impact resistive layer which absorbs impact, is in the structure of the packaging material layer.

6. A packaging container comprising where the packaging material according claim 1, is used.

7. The packaging material according to claim 1, wherein comprising that a base material film, said light-blocking printed layer, and a sealant film are laminated in subsequent manner.

8. The packaging material according to claim 7, wherein said sealant film is laminated in plural-layer.

9. The packaging material according to claim 7, wherein the base material film is a transparent gas barrier film.

* * * * *